US012695727B2

(12) United States Patent
Lapko

(10) Patent No.: US 12,695,727 B2
(45) Date of Patent: Jul. 28, 2026

(54) METHOD FOR ANALYZING SERVICES OF NODES OF A NETWORK

(71) Applicant: dSPACE GmbH, Paderborn (DE)

(72) Inventor: Radoslaw Lapko, Paderborn (DE)

(73) Assignee: dSPACE GmbH, Paderborn (DE)

( * ) Notice: Subject to any disclaimer, the term of this patent is extended or adjusted under 35 U.S.C. 154(b) by 224 days.

(21) Appl. No.: 18/084,658

(22) Filed: Dec. 20, 2022

(65) Prior Publication Data

US 2023/0198954 A1     Jun. 22, 2023

(30) Foreign Application Priority Data

Dec. 21, 2021    (EP) ..................................... 21216320

(51) Int. Cl.
*H04L 9/40*          (2022.01)
(52) U.S. Cl.
CPC .................................... *H04L 63/04* (2013.01)
(58) Field of Classification Search
CPC ...................................................... H04L 63/04
See application file for complete search history.

(56) References Cited

U.S. PATENT DOCUMENTS

| 5,694,542 | A | | 12/1997 | Kopetz | |
| 9,177,428 | B2 * | 11/2015 | Nguyen | ............... | G07C 5/0808 |
| 11,059,490 | B1 * | 7/2021 | Migneco | .............. | A61B 5/0816 |
| 11,335,139 | B1 * | 5/2022 | Brunda | ................ | G07C 5/0808 |

| 2010/0333070 | A1* | 12/2010 | Farnsworth | ......... | G06F 11/3457 |
| | | | | | 711/170 |
| 2012/0289166 | A1* | 11/2012 | Chmielewski | ........ | H04W 76/18 |
| | | | | | 455/67.11 |
| 2015/0067148 | A1 | 3/2015 | Kim | | |
| 2015/0312176 | A1* | 10/2015 | Jones | ...................... | H04L 67/10 |
| | | | | | 709/206 |
| 2016/0328890 | A1* | 11/2016 | Keane | .................... | G07C 5/008 |
| 2021/0014341 | A1* | 1/2021 | Weber | .................... | H04L 69/22 |
| 2021/0035381 | A1* | 2/2021 | Wu | .......................... | H04L 67/10 |
| 2021/0297268 | A1* | 9/2021 | Weng | ........................ | H04L 9/50 |
| 2022/0063432 | A1* | 3/2022 | Mercer | .................. | B60L 53/14 |

OTHER PUBLICATIONS

Bhagwat, Samir: "A Service Oriented Architecture SOME/IP" Intrepid Control Systems, pp. 1-29, Apr. 30, 2019, retrieved from the internet May 20, 2022, XP055923332, https://www.intrepidcs. net.cn/wp-content/uploads/2019/05/110_SOME-IP_TD_USA_2019. pdf.
Extended European Search Report dated Jun. 1, 2022 in corresponding application 21216320.8.

* cited by examiner

*Primary Examiner* — Dhairya A Patel

(74) *Attorney, Agent, or Firm* — Muncy, Geissler, Olds & Lowe, P.C.

(57)          ABSTRACT

A method for analyzing services of nodes of a network which communicate with each other over the network, wherein the communication of the nodes with each other over the network comprises sending messages from at least one node to at least another node over the network. This way a method for analyzing the services in a network is provided that is simpler and less error-prone.

18 Claims, 5 Drawing Sheets

METHOD FOR ANALYZING SERVICES OF NODES OF A NETWORK

This nonprovisional application claims priority under 35 U.S.C. § 119(a) to European Patent Application No. 21216320, which was filed in Europe on Dec. 21, 2021, and which is herein incorporated by reference.

BACKGROUND OF THE INVENTION

Field of the Invention

The present invention relates to a method for analyzing services of nodes of a network which communicate with each other over the network, wherein the communication of the nodes with each other over the network comprises sending messages from at least one node to at least another node over the network. Especially, the network may be a data transmitting bus system.

Description of the Background Art

The exchange of information in the form of data between many nodes is applied in a complex way, especially in modern technical systems. A widespread application is, for example, electronic control systems in motor vehicles. Modern motor vehicles have many assistance systems and/or entertainment systems, all of which use communication via nodes, preferably via electronic control units, and provide respective services.

During the implementation of new nodes or during the test of nodes or of several provided services in a complex technical system, it is necessary to do a complex analysis of service discovery communication protocols to find out if each node or service is working properly. Service discovery protocols offer the possibility to self-organize the network and services during runtime. In the service discovery procedure, the communication within the bus system occurs between a providing node, which acts as a provider, and a consuming node, which acts as a consumer.

During the network startup process and later on, the provider announces the offered services and/or the consumer requests the services for consumption. It is important to check whether the services are offered and consumed correctly, for example in the right time, and whether the service communication works according to the specification.

Until now, the status of communication in service discovery processes at a given point in time could only be traced with difficulty from data records. Conventional analyses of services at a given point in time required the tracking of large amounts of data records. However, going through the data packets step-by-step is particularly time consuming, since the more complex the technical system is, the larger are the data packets. Today's networks of motor vehicles can contain a few hundred services, so such a way of analysis is not only time consuming, but also very difficult and error-prone. There are many scenarios, which have to be checked to recognize whether the service discovery protocol works as intended. Conventional methods do not yet allow for a simple and quick analysis of communication protocols between nodes to be.

SUMMARY OF THE INVENTION

It is therefore an object of the present invention to provide a method for analyzing the services in a network that is simple and quick.

According to the invention, a method for analyzing services of nodes of a network which communicate with each other over the network is provided, wherein the communication of the nodes with each other over the network comprises sending messages from at least one node to at least another node over the network, the method comprising the following method steps: a) checking for at least a part of the messages whether a respective message comprises a service information and ignoring a message if the respective message does not comprise a service information; b) analyzing the service information of messages which comprise a service information by identifying from the service information of a respective message at least one of the following information: the sending node, the receiving node, the service identification number, the service action between the sending node and the receiving node, the status of the communication connection between the sending node and the receiving node, and the time to live of the communication connection; c) saving the previously identified information in a plurality of service instance history tables, respectively; and d) visualizing the previously identified information by a visualization unit on the basis of the plurality of service instance history tables.

It is therefore an important point of the invention that due to the analysis of the service information of the messages and due to the assignment of the service information to the service instance history tables, the service information can be retrieved efficiently for visualizing the service information so that the services can be monitored in a particularly easy way.

In step a), checking for at least a part of the messages whether a respective message comprises a service information is usually done based on the communication protocol where the specification of the messages is given, i.e., where to find the service information.

During the analysis only the service-relevant messages are analyzed. All other messages, for example address resolution protocol (ARP)-messages, do not have to be considered. This can reduce the amount of data to be analyzed and displayed, which reduces the complexity.

If the term "identifying the sending and the receiving node" is used in this context, this can mean e.g., identifying the "provider" and the "consumer". The network nodes, for example the ECU in motor vehicles, can play both roles simultaneously, so that it is determined whether a single node is sending or receiving a message. For one service, "consumer" and "provider" are fixed and may exchange messages, each either as sender or as receiver, e.g. the consumer may send a request and the provider receives it or the provider may send an offer and the consumer receives it.

If the term "time to live" is used in this context, this may mean the time a specific process exists.

The nodes can be electronic control units, and in particular, automotive electronic control units (ECU) for motor vehicles.

In step b) the service information can be analyzed at a predetermined time. Here, "at a predetermined time" can mean that the service information is analyzed at defined points of time or at specific events, for example at the arrival of the message, and/or that the service information is analyzed when requested. For example, the timestamp of the arrival of the message is known and part of the service information saved to the service instance history tables so that the service information can be displayed in time resolution. In this way, a monitoring of the current and/or the past state of services is possible, so that a user can select a specific point in time and read the state of service at this time.

Each service can have a unique service identification number (service ID). Even if a service is offered to multiple receiving nodes, the same service ID is used. When the sending node and the receiving node of a message have been identified, each pair of a sending node and a receiving node, e.g., a service providing ECU and a service consuming ECU may be identified clearly and so that for each service a separate service instance history table with service information can be created. This provides an easy possibility to query the service information related to a particular service. Otherwise, a service instance history table is created for every service ID. However, visualization may be provided for selected pairs of providers and consumers only.

If there are several kinds of service IDs, e.g., the service identification in SOME/IP is based on a general service ID, a service instance ID and on the major and minor version number. There are several possible embodiments that may be based on the different service IDs or a further specification of the service ID in the service instance history table. For example, if the general service ID is chosen as ID for the service instance history table, then the service instance history table might provide a column for the service instance ID for further specification. The service identification according to the SOME/IP Protocol standard can be chosen as unique identifier for the service instance history table.

According to an example the method further comprises the following steps: c1) determining for an analyzed service information whether a service instance history table has already been generated for the corresponding service identification number, and c2) in case that a service instance history table for the respective service identification number has not yet been generated, generating a service instance history table for the respective service identification number, or in case that a service instance history table for the respective service identification number has already been generated, completing the service instance history table for the respective service identification number with the analyzed service information.

Each communication connection and, hence, each service identification number may have its own service instance history table. However, this is not mandatory. In case the service instance history table does not yet exist, a new service instance history table for the respective service identification number is generated. In case the service instance history table already exists, the service information is added to that service instance history table. In this way, a plurality of tables is created and filled with data so that the service information for each communication connection can be easily tracked.

The method further can comprise the following step: e) repeating successively the steps a) to d) to analyze the services and providing the service information for each service over time.

The visualization and the monitoring may not only be provided for a specific time, but also for a specific time period. The repetition of the steps may be performed at a predetermined frequency, so that the service information can be analyzed in regular adjustable time intervals.

The method further can comprise the following step: f) predicting an arrival time of an expected message following a previous message depending on the previous message.

The next expected message is calculated, for example, based on a maximum allowed response delay.

The method further can comprise the following steps: g) monitoring if the expected message has been received at the predicted arrival time; and h) outputting a warning message in case the expected message has not been received at the predicted arrival time.

The warning message can be a part of a log file or can be visualized by different symbols. Here, "at the predicted arrival time" may mean at the predicted arrival time plus a predetermined tolerance range. In this way, errors in the communication connection can be detected automatically when sending messages.

The monitoring can be done continuously or on demand. Consequently, the analysis can take place at defined times or be triggered by manual intervention.

The status of the communication connection can comprise the state of "sent", "ready", "not ready", "subscribed", "find service", "stop offer" and/or "service expired". The state of the service may be identified based on the communication protocol (e.g., service expired) or communication matrix (e.g., message too early).

The services can be used for transmitting data, e.g., for infotainment systems, driver assistance systems and/or diagnostic systems. The transmission of technical data comprises in particular coordinates for GPS or a temperature of hardware, for example the temperature of an automotive motor, for diagnostic systems or a vehicle speed for driver assistance systems.

Identifying the service action between the sending node and the receiving node can be based on a communication protocol and/or on a communication matrix, where the messages and their structure are specified. In case the identification is based on a communication matrix, additional information can be provided and saved in the respective service instance history table.

In order to test the system and the nodes in a state when consumers are not implemented yet, the consumer behavior can be simulated. Monitoring with simulated consumer behavior is named intrusive monitoring. The consumer behavior can be simulated by a service analyzer that also analyzes the communication connection for non-intrusive monitoring. At least one node may be simulated by sending a request if some service offers are detected.

The service information saved in the service instance history tables can be visualized by different graphical symbols. Each node, e.g., each ECU, is for example visualized by a box that may be connected to other boxes. The connection in turn can also be visualized by different symbols dependent on the service state and/or the connection. Service state symbols can be for example filled up, be solid, dotted, dashed, mixed and/or contain graphical pictograms, numbers and/or letters. The graphical pictograms, numbers and/or letters can be arranged above, under, in the middle of the symbol, on the left of the symbol and/or on the right of the symbol. Connection symbols can be for example solid, dotted, dashed and/or mixed, and can contain arrows and/or associated graphical pictograms, numbers, letters, window with more information especially above, under, in the middle of the line, on the left side of the line and/or on the right side of the line. More details on the visualization are explained in the description of the figures.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
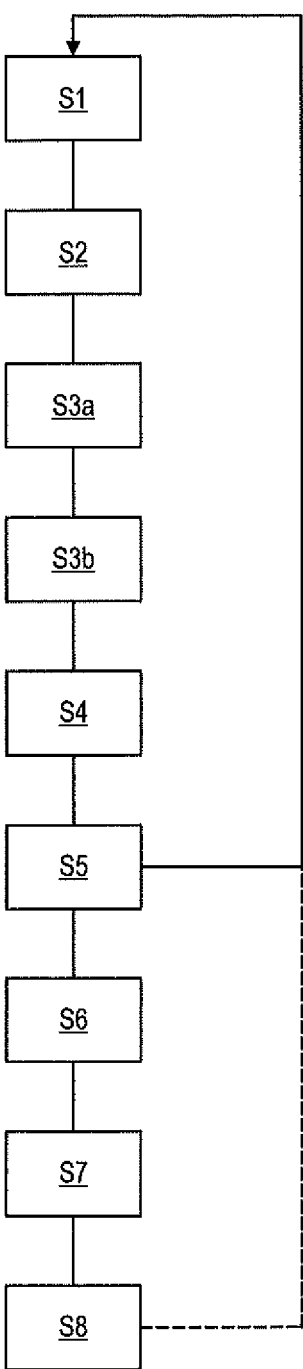
FIG. 1 schematically shows a method for analyzing services of nodes according to an example.

FIG. 1 shows a flowchart of a method for analyzing services 2A, 2B, 2C of nodes 1A, 11B, 1C of a network which communicate with each other over the network. In a first step S1 the data of messages is filtered, so that the messages that do not comprise service information 6 are filtered out. Only the messages that comprise service information 6 are analyzed in the second step S2. The service information 6 is analyzed by identifying from the service information 6 of a respective message the sending node 10, the receiving node 12, 14, the service identification number, the service action 30 between the sending node 10 and the receiving node 12, 14, the status of the communication connection 40 between the sending node 10 and the receiving node 12, 14, and/or the time to live of the communication connection.

In a third step which is comprised of sub steps S3a and S3b the service information is saved in several service instance history tables 3. For this purpose, in step S3a it is determined whether a service instance history table 3 has already been generated for a corresponding service identification number. Second S3b, a service instance history table 3 is generated in case that a service instance history table 3 for the respective service identification number has not yet been generated. Otherwise, if a service instance history table 3 for the respective service identification number has already been generated, the service instance history table 3 is completed for the respective service identification number with the analyzed service information 6.

In a fourth step S4 the service information 6 is visualized based on the service instance history tables 3 by a visualization unit 4.

In a fifth step S5 the analysis steps S1 to S4 are repeated so that the service information 6 can be provided and visualized over time.

In steps S6 to S8 an arrival time for an expected message is additionally predicted. The arrival time is predicted based on the previous message. The expected message is monitored and in case the expected message has not been received at the predicted arrival time, a warning message or symbol for warning status 40 is output. These steps can also be repeated at regular intervals so that a plurality of messages can be predicted and monitored (indicated by the dashed line).

Figure 2A:
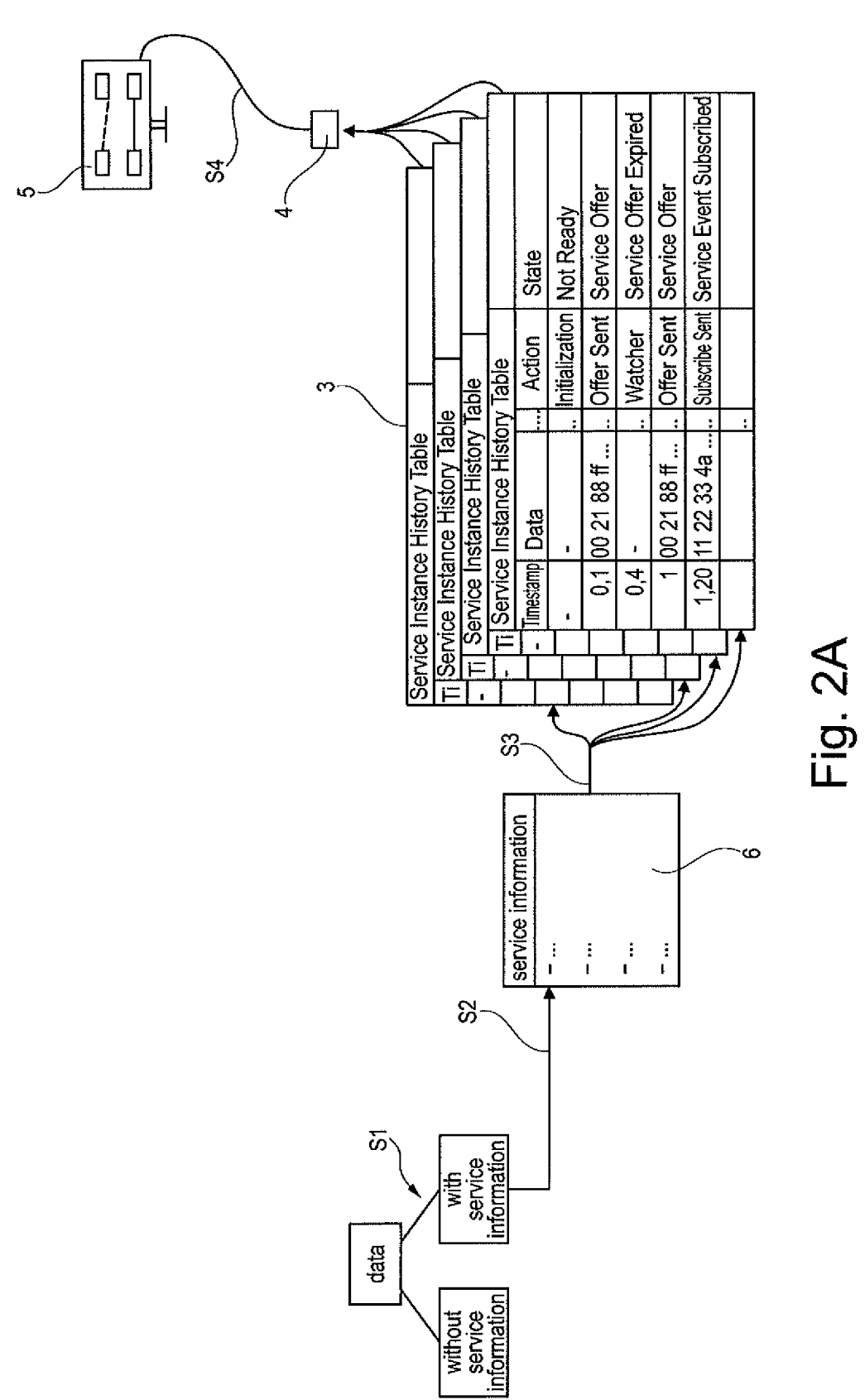
FIG. 2A schematically shows the method for analyzing services of nodes according to an example.

FIG. 2a shows the data flow according to an example of the invention in another representation. First, in step S1 the messages are filtered by analyzing whether a message comprises service information 6 or not. These messages which comprise service information 6 are analyzed in the second step S2. Messages which do not comprise service information 6 are ignored. Before the messages can be analyzed they must first be decoded. Then, the relevant messages are analyzed by identifying their content. As already mentioned, this includes information about the sending node 10, the receiving node 12, 14, the service identification number, the service action 30 between the sending node 10 and the receiving node 12, 14, the status of the communication connection 40 between the sending node 10 and the receiving node 12, 14, and/or the time to live of the communication connection. All this information is saved in step S3 to several service instance history tables 3. Each pair of sending node 10 and receiving node 12, 14 gets its own service ID and the information according to each service ID is saved in a separate service instance history table 3. The service information 6 saved in the service instance history tables 3 is provided for the visualization unit 4 which visualizes the service information 6 so that a user can observe the services and communication connections on a monitor 5 for certain pairs of communicating nodes without the need to filter out the data of other communication participants.

Figure 2B:
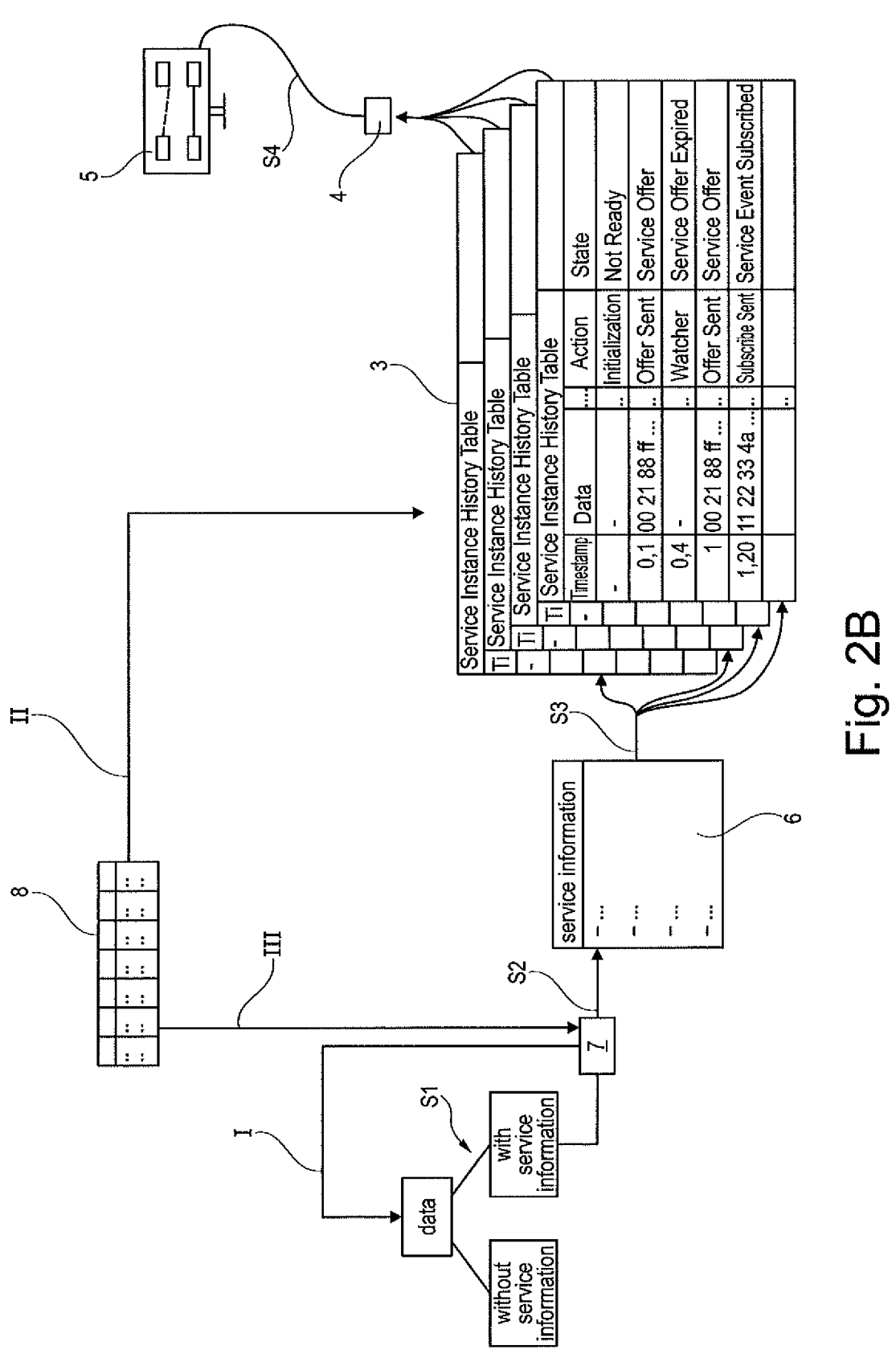
FIG. 2B schematically shows the method for analyzing services of nodes of FIG. 2a in an example.

FIG. 2b shows the data flow shown in FIG. 2a with three additional embodiments. First, in order to test the services in an incomplete network, for example if some consumers are not implemented yet, it is possible by actively simulating the consumer by a service analyzer 7 to stimulate the provider—this case is named "intrusive" monitoring. The service analyzer simulates the consumer's behavior in step I by actively subscribing the services or sending service requests to the provider for services selected by the user, for example each service on the network and/or a group of services.

If the data is generated out of a communication matrix, additional information can be collected and saved in the service instance history tables 3 (e.g., node name, service name etc.) in order to visualize it in step II.

For an intrusive monitoring with a communication matrix the service analyzer uses the information from the communication matrix in step III, e.g., the service ID. For simulating non-existing consumers, the service analyzer impersonates the consumer by simulating consumer addresses, for example MAC, IP, taken from the not active Application Endpoint, and other consumer's identification information in sending packets.

Figure 3A:
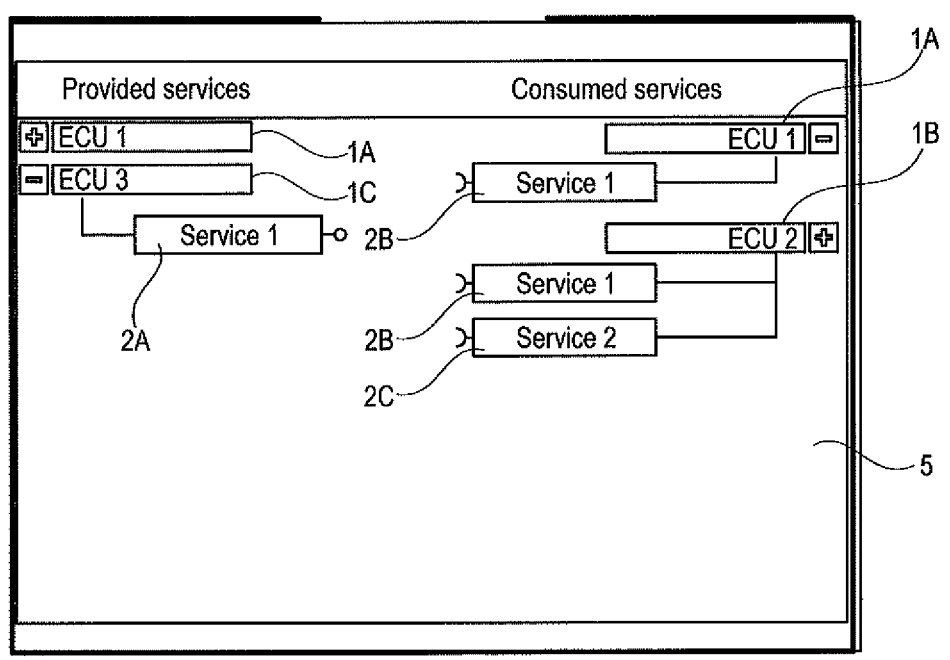
FIGS. 3A to 3D schematically shows visualization examples of analyzed service information.

FIGS. 3A to 3D show visualization examples of analyzed service information shown on the monitor 5. In FIG. 3A the services 2A, 2B, 2C of the nodes 1A, 1B, 1C are visualized in form of two columns. The provided service 2A is shown in the left column, while the consumed services 2B, 2C are shown in the right column. The states of the services are represented by symbols 40 connected to the services 2A, 2B, 2C, here empty circles and half circles, i.e., the current state is represented by the symbols assigned to the boxes that represent the services. The service actions 30 are represented by arrows. The columns order can be changed and/or the columns can be hidden as well, so that only the provided or consumed services are shown.

Figure 3B:
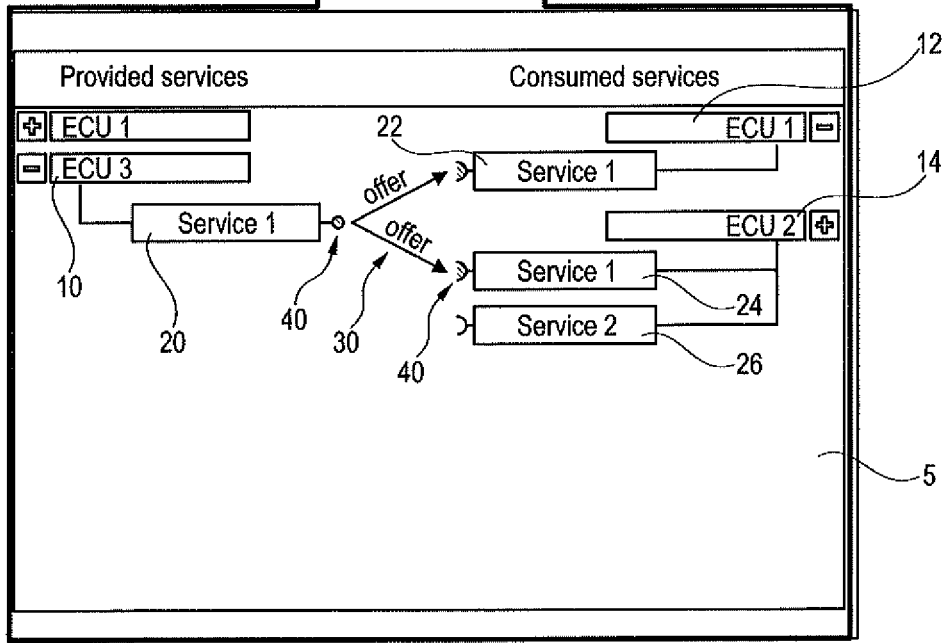
Figure 3C:
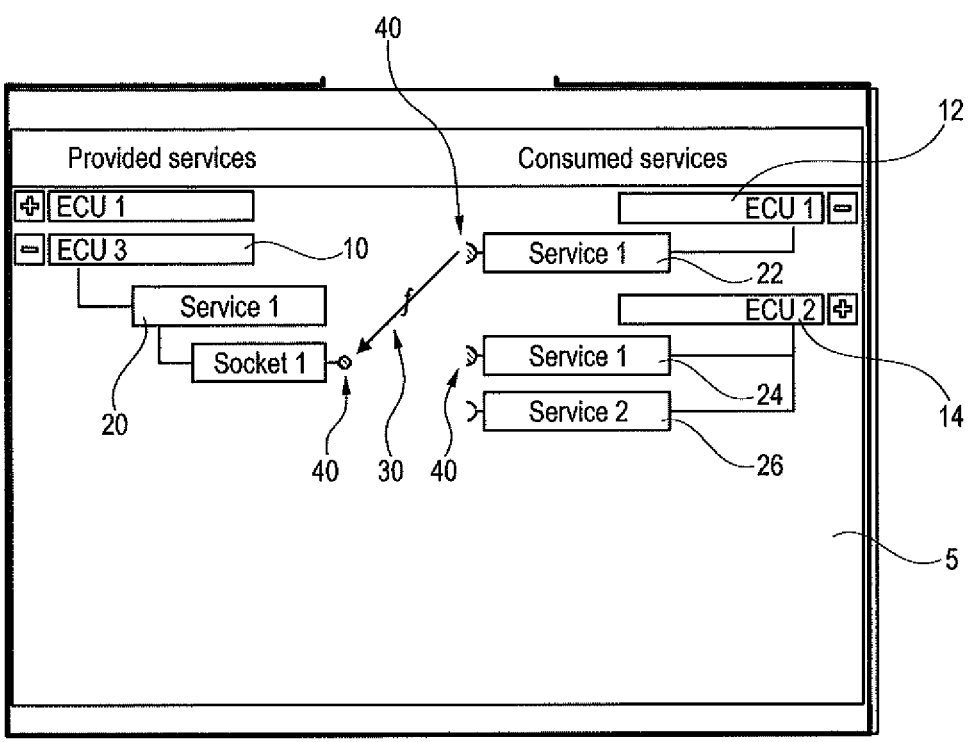
Figure 3D:
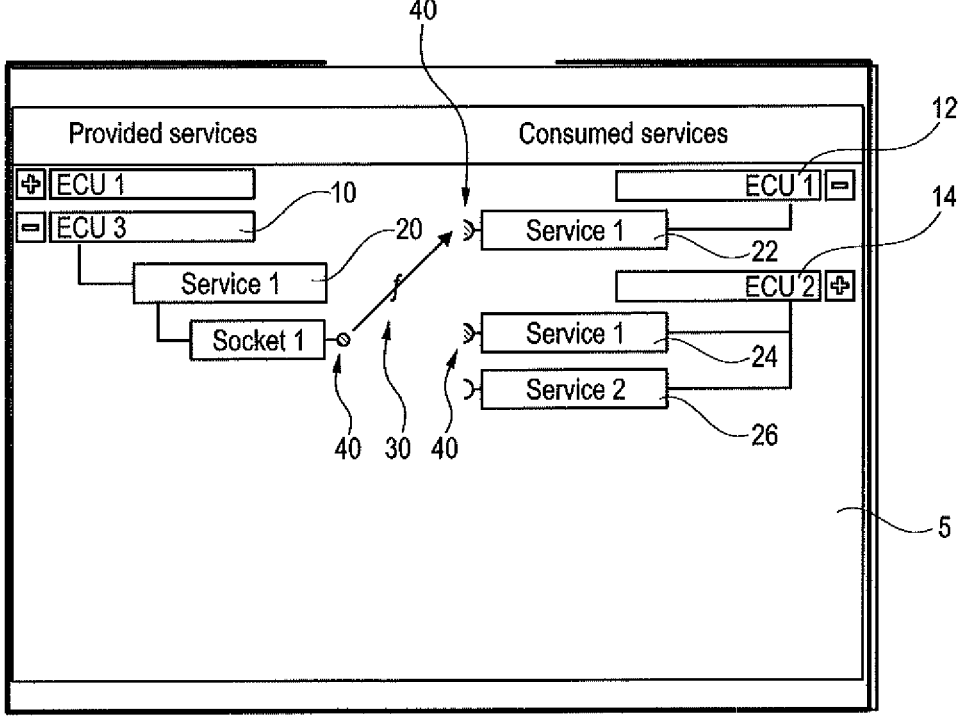

While FIG. 3A shows the service information 6 at the out stance (t=0), FIG. 3B shows the service information 6 at a further step (t+1). The service 20 has executed the service action 30 "offer sent". The state 40 of the service communication of Service 1 on the provider side is "service offer", symbolized by filled a closed circle. The state of Service 1 on the consumer side at service 22 is "offer received", symbolized by a filled half circle. The communication was sent by the sending node 10, i.e., the provider of the service Service 1, to the service consumers 22, 24 on the receiving nodes 12, 14, i.e. the consumers of Service 1. FIG. 3C shows a further step (t+2). The originally receiving node 12, namely the consumer, sends a request back to the originally sending node 10, namely the provider. In a further step (t+3) shown in FIG. 3D the provider sends thereupon a response to the consumer. It can be seen from FIGS. 3C and 3D that Service 2 26 has not received any service offering message that the state of the service 2 26 is "not ready", symbolized by an unfilled half circle.

Malfunctions and the state of the services can be presented graphically especially by using different colors, icons and/or lines between services.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for analyzing services of nodes of a network which communicate with each other over the network, wherein the communication of the nodes with each other over the network comprises sending messages from at least one node to at least another node over the network, the method comprising:

a) checking for at least a part of the messages whether a respective message comprises a service information and ignoring a message if the respective message does not comprise a service information;

b) analyzing the service information of messages which comprise a service information by identifying from the service information of a respective message, the service information comprising: the sending node, the receiving node, the service identification number, the service action between the sending node and the receiving node, and the status of the communication connection between the sending node and the receiving node;

c) saving the previously identified service information in a plurality of service instance history tables, respectively, wherein each pair of a sending node and a receiving node has an associated service identification number, and service information according to each service identification number is saved in a separate service instance table; and d) visualizing the previously identified service information by a visualization unit on the basis of the plurality of service instance history tables.

2. The method according to claim 1, wherein the nodes are electronic control units.

3. The method according to claim 1, wherein in step b) the service information is analyzed at a predetermined time.

4. The method according to claim 1, wherein each service has a unique service identification number.

5. The method according to claim 4, further comprising:

c1) determining for an analyzed service information whether a service instance history table has already been generated for the corresponding service identification number; and c2) in case that a service instance history table for the respective service identification number has not yet been generated, generating a service instance history table for the respective service identification number, or in case that a service instance history table for the respective service identification number has already been generated, completing the service instance history table for the respective service identification number with the analyzed service information.

6. The method according to claim 1, further comprising:

e) repeating successively the steps a) to d) to analyze the services and providing the service information for each service over time.

7. The method according to claim 1, further comprising:

f) predicting an arrival time of an expected message following a previous message depending on the previous message.

8. The method according to claim 7, further comprising:

g) monitoring if the expected message has been received at the predicted arrival time; and h) outputting a warning message in case the expected message has not been received at the predicted arrival time.

9. The method according to claim 1, wherein the monitoring is done continuously or on demand.

10. The method according to claim 1, wherein the status of the communication connection comprises the state of "sent", "ready", "not ready", "subscribed", "find service", "stop offer" and/or "service expired".

11. The method according to claim 1, wherein the services are used for transmitting data for infotainment systems, driver assistance systems and/or diagnostic systems.

12. The method according to claim 1, wherein identifying the service action between the sending node and the receiving node is based on a communication protocol and/or on a communication matrix.

13. The method according to claim 1, wherein the service information further comprises a time to live of the communication connection.

14. The method according to claim 1, wherein the status of the communication connection comprises states of "sent", "ready", "not ready", "subscribed", "find service", "stop offer" and "service expired".

15. The method according to claim 1, further comprising:

performing an intrusive monitoring by a service analyzer, the intrusive monitoring comprising simulating a behavior of a consumer node.

16. The method according to claim 1, wherein the status of the communication connection comprises any of "sent", "ready", "not ready", "subscribed", "find service", "stop offer" and/or "service expired".

17. The method according to claim 1, wherein the service ID is unique to a paring of the sending node and receiving node.

18. The method according to claim 1, wherein the sending node in the service information identifies a first specific node of the network and the receiving node in the service information identifies a second specific node of the network.

* * * * *